United States Patent Office 3,463,076
Patented Aug. 26, 1969

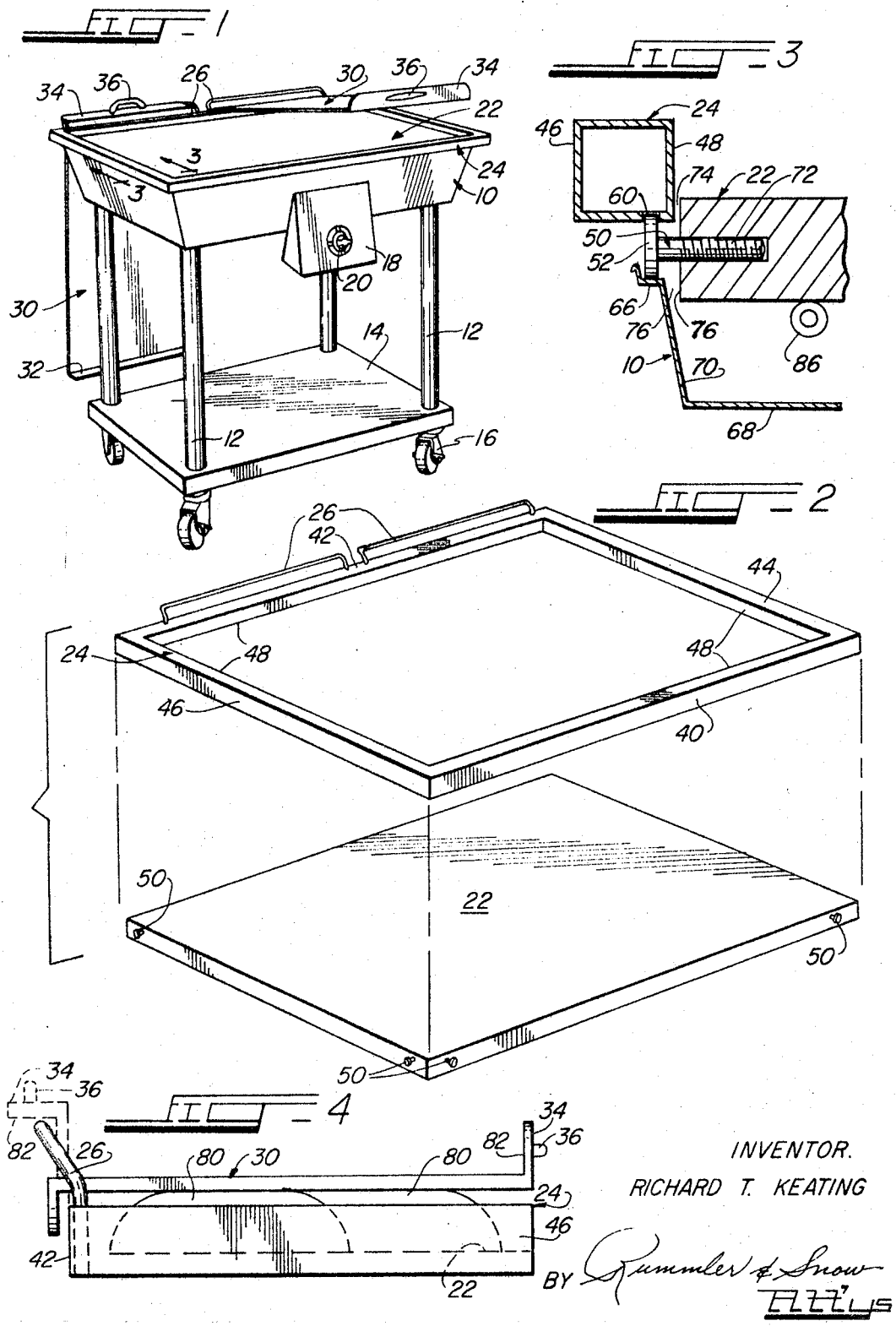

3,463,076
BUN TOASTER
Richard T. Keating, 4301 W. Madison St.,
Chicago, Ill. 60624
Filed Oct. 6, 1967, Ser. No. 673,317
Int. Cl. F24c 15/10; A47j 37/06
U.S. Cl. 99—349                                  7 Claims

ABSTRACT OF THE DISCLOSURE

The disclosure describes a bun toaster and griddle having a wheeled stand with a body member or tray which supports a griddle having a lift-off perimetrical frame member, spaced therefrom and supporting removable loosely hinged bun boards at one edge which hold the buns in contact with the griddle. In one embodiment the griddle plate has at least one supporting lug at each of its peripheral edges which lugs engage the flanges of an open-topped tray to support the griddle plate in spaced relationship across the open top and which lugs are also engaged by and hold in spaced relationship a lift-off perimetrical frame member so that the edges of the griddle are insulated. Other embodiments are disclosed including the provision of handles on the lift-off frame serving as hinges and retainer guides for the bun boards thereon.

Background of the invention

In the design of electric or gas-fired griddles for home or commercial use it is desirable that they be free of inaccessible corners, close-fitting parts such as pin hinges, ornamentation, and other areas subject to heat in which food particles or cooking oils and grease can gather to form unsightly char accumulations. The time and money lost in cleaning griddles and hot plates are important considerations for a restaurant owner even with the now available oven and griddle cleaners. Furthermore, there exists the problem of properly insulating the hot griddle plate so that those parts, which are likely to be touched, leaned upon or must be held in the operation of the griddle, are at a much lower temperature than the griddle plate itself to avoid the danger of burns or fire.

This invention concerns a device for the heat treatment of food and the like which is easily dismantled and cleaned, free of places for the accumulation of food and grease, convenient to use and having an insulated, removable, perimetrical frame member mounted in spaced relationship from the griddle plate and having dual-function handles on the frame. This invention also concerns a tray and frame arrangement for a hotplate or griddle which is insulated from the operator and the heated parts thereof are less susceptible to the accumulation of char from food and grease. The device of this invention overcomes the aforesaid difficulties of the prior art by providing lug members on the heating plate which support same in spaced relationship from the body of the heating plate support and also function to hold the perimetrical frame member in a manner preventing heat conduction thereto.

Accordingly it becomes an object of this invention to provide a bun toaster having a lift-off frame holding one or more bun boards for movement relative to the hot plate and also so as to be easily tilted to a recessed position behind the griddle plate. The invention also provides bun boards which are easily removable and cooperate with the offset handle members of the perimetrical frame member to hang and cool between cycles of use.

These and other objects of this invention will become apparent or be described as the specification proceeds.

Description of the drawings

A specific embodiment of this invention is shown in the accompanying drawings in which:

FIG. 1 is a front perspective view of the bun toaster and griddle of this invention;

FIG. 2 is an exploded view of the griddle plate and perimetrical frame member;

FIG. 3 is a fragmentary cross-section view taken along the lines 3—3 in FIG. 1; and FIG. 4 is a partial end view of the bun toaster-griddle of this invention to show the relationship of the parts during use and showing in dotted outline the position of bun boards when in the recessed position.

The preferred embodiment

Referring to the drawings, particularly FIG. 1, the bun toaster-griddle is shown to comprise a body or housing member 10 supported at its corners by the tubular leg members 12 held by the lower shelf 14 and having the casters 16 at their bottom ends. A front panel 18 supports the thermostat control 20 of the type used for heavy duty service whether the toaster is gas-fired or electrical.

The griddle plate 22 has a lift-off perimetrical frame 24 on one side of which are a pair of loop handles 26 serving as guides for the bun boards 30. The griddle plate 22 may be any type of heating or cooking element and is preferably an iron or aluminum plate of sufficient thickness to perform these functions. The back edge of the bun boards have flanges 32, while the forward edges have oppositely disposed flanges 34. The flanges of the bun boards, which are stainless steel or aluminum sheets, are preferably integral with the boards and are formed by stamping and bending. A suitable handle 36 is provided on the forward flange 34 of each bun board.

Referring to FIG. 2 there is shown the relationship of the perimetrical frame 24 with the griddle plate 22 with the frame 24 in lifted position. The frame 24 comprises front and rear tubular steel members 40 and 42 and like side members 44 and 46, preferably of rectangular cross-section, which are welded or otherwise held together in the peripheral shape of the griddle plate 22 such that their inner edges 48 define an area slightly larger than that of the griddle surface. Each edge of the griddle plate 22 has at least one lug or bolt member 50 extending therefrom sufficiently to support the frame member 24 and it is preferred but not necessary, that each lug have an enlarged head 52. As illustrated each edge of the griddle plate 22 has a pair of the lugs 50, each lug being located near a respective corner of the plate. While FIG. 2 shows only two of the plate edge surfaces, it will be understood that the opposite plate edges have the lugs 50 disposed in the same manner. It will be understood that other means for supporting the frame 24 on and in perimetrically spaced relation with the griddle plate 22 may be employed as as long as the removable frame character of the assembly is maintained.

The relationship of these parts is more clearly shown in FIG. 3 wherein the side member of the frame 24 has a recess 60 which engages the top edge of the lug head 52 while the bottom edge of the said lug head rests upon the L-shaped flange 66 on the periphery of the side walls of the body member 10. The body member 10 is preferably a pan formed of stainless steel and having a bottom 68 extending between side walls outwardly flared therefrom.

The lug 50 is mounted in any suitable manner on the side edges of the griddle plate 22 as by press fitting or by means of screw threads 72 as shown so that the heads 52 are uniformly spaced outwardly therefrom. By this arrangement the inner edge 48 of the frame member 24 is held in spaced relation, as at 74, from each edge of the griddle 22 and also from the body 10. A space 76 is also provided between the sides 70 of the body 10 and the outer edges of the griddle plate 22. The recess 60 can be omitted if desired and other suitable means can be used to insure that the frame member 24 always rests upon the lugs 50 in such a manner as to provide the space 74 therearound. The spaces 74 and 76 are about ⅛ inch to ¼ inch wide so that food particles and excess grease can fall between the griddle and the frame and into the pan of the body 10 when the griddle plate is scraped or otherwise cleaned. It should be understood that, in any case, where collection of grease in the said pan is undesirable, a small peripheral gutter or scupper, not shown, may be mounted on the bottom edge of the griddle plate to catch the material passing through the space 76.

In FIG. 4, there is shown one of the bun boards 30 in operable position resting upon the half buns 80 disposed with their cut faces against the griddle plate 22 and in the process of being toasted. The buns make even contact with the griddle plate and hold the heat therein for fast toasting. In this position, the back edge of the bun board is retained by the flange 32 engaging the outer face of the frame 24 and the bun board is positioned over its section of the griddle plate by the loop handle 26. The loop handles 26 are offset rearwardly beyond the back edge 42 of the frame member 24 so that when the toasting process is completed, the bun board 30 is merely raised by the handle 26 and moved rearwardly within the loop handle 26 to the hanging position indicated by the dotted lines in FIG. 4. In this position the back surface 82 of the front flange 34 engages the top of the loop handle and the bun board hangs vertically in out-of-the-way position. The offset of the handle 26 is at least about the thickness of the bun board so that vertical placement of the latter with a minimum of rearward movement is possible allowing the use of the toaster against a wall without interference with their placement in the hanging position.

The bun boards 30 are long enough to cover the width of the frame member 24 and the sum of the widths of the bun boards is about equal to the length of the opening in the frame member 24. The loop handles 26 are spaced sufficiently above the griddle surface to allow the bun boards to accommodate buns of various thicknesses and are fixedly attached to the frame member 24 by any suitable means. Means for heating the griddle plate 22 are shown at 86 (FIG. 3) which may represent electrical resistance elements or gas jets or the like. Where electrical heating is used three 3-kw. 220-volt single phase heating elements can be used for a 22″ x 30″ griddle plate.

Preferably the device of this invention is sized to accommodate about 48 halves of buns. The griddle plate can be about ⅜ inch in thickness and is positioned about 34 inches from the floor for proper working height. The lift-off frame 24 is preferably constructed of one inch square stainless steel tubing. The bun boards are also of stainless steel or aluminum and can be readily lifted off for cleaning. A feature of this invention is that the entire surface of the griddle plate can be cleaned without removing the peripheral frame and that when desired the frame member 24 can be readily lifted off for cleaning. With the frame member 24 and the bun boards in operative position the griddle plate 22 can be kept perfectly clean since there are no interfering corners or edges to prevent scraping or scouring to the very edge of the entire plate periphery. The frame member 24 also serves as a retaining edge for the buns and during use remains relatively cool due to the insulating spaces 74 and 76. Although the griddle plate 22 and the frame member 24 are shown with a rectangular configuration, any shape can be used for these parts. The frame member can be formed of square stock as illustrated or of round or tubular stock. It suffices if the perimetrical frame member has its inner periphery spaced outwardly from the other peripheral edge of the griddle plate sufficiently to insulate the frame member and maintain it at a temperature sufficiently below that of the plate to avoid contact burns of the operator. During use of the griddle the frame member normally remains at a temperature of about ambient temperature to about 20° F. above ambient temperature.

What is claimed is:

1. In a griddling device the combination of:
    (a) a flat-surfaced griddle plate having an outer peripheral edge;
    (b) a body member supporting said plate and means for heating the plate;
    (c) peripherally spaced lug members extending outwardly from the peripheral edges of said plate;
    (d) a unitary frame member surrounding said plate and resting on said lug members in spaced relation with the periphery of the plate;
    (e) said frame being of the same peripheral contour as the said plate and of a thickness to project above the top surface thereof;
    (f) means for holding said frame member in concentric relation with the plate; and
    (g) a flat bun board resting upon and extending across said frame member to span the surface of said plate, said bun board being unattached and freely movable relative to said frame.

2. A griddling device in accordance with claim 1 in which said body member comprises a pan having upstanding side walls and said lug members engage said side walls to support said plate therefrom in a peripherally spaced relation therewith.

3. A griddling device according to claim 1 wherein the means for holding the frame member in concentric relation with the plate comprise enlarged heads on said lug members, and said frame member has complementary means for interlocking engagement with the said enlarged heads.

4. A griddling device in accordance with claim 1 wherein:
    (a) a longitudinally extending loop handle is mounted on said frame member to project upwardly therefrom; and
    (b) said bun board has an upturned flange at its forward end and a downturned flange at the opposite end, said opposite end extending through said loop handle whereby said loop handle serves as a guide for upward and sliding rearward movement of the bun board.

5. A griddling device in accordance with claim 4 wherein:
    (a) said loop handle is offset outwardly from said frame member and serves as a fulcrum for rearwardly upward swinging movement of said bun board about said loop handle and sliding movement through the loop handle so as to dispose said bun board in a vertical hanging position with its said upturned forward end engaged by and resting on said loop handle.

6. A bun toaster comprising in combination:
    (a) a housing member having upstanding walls with outwardly flanged upper edges;
    (b) a flat griddle plate nested within the walls of said housing member and having lug members extending outwardly from its peripheral edges for engaging the flanged upper edges of said walls;
    (c) a removable unitary frame member surrounding said griddle plate and spaced outwardly from the edges thereof, said member resting upon said lug members;
    (d) an elongated handle bar attached to one side of said frame member in vertically spaced relation therewith, said handle bar being offset outwardly from the outer edge of said frame member; and (e) a bun board having a substantially flat body with an upwardly directed flange at the forward end thereof, said bun board extending from beneath said handle bar end being normally disposed in a horizontal position across said frame member and over said griddle plate, and said bun board being upwardly swingable about said handle bar as a fulcrum and slidable downwardly therethrough to a vertical position so as to hang from said handle bar by said flange.

7. A bun toaster according to claim 6 wherein the said lug members have enlarged heads spaced outwardly from the edges of said griddle plate, and said frame member has appropriately spaced recesses in its bottom surface to receive edgewise the heads of said lugs.

References Cited

UNITED STATES PATENTS

| | | | |
|---|---|---|---|
| D.121,865 | 8/1940 | Chamberlain. | |
| 2,163,258 | 6/1939 | Lautz | 126—214 |
| 2,362,757 | 11/1944 | Lang | 99—425 |
| 2,682,831 | 7/1954 | Pellegrin | 99—425 |
| 2,699,162 | 1/1955 | Nazzaro | 126—24 XR |
| 2,922,357 | 1/1960 | D'Arcey et al. | 99—379 |
| 3,263,595 | 8/1966 | Bower | 99—349 |

WALTER A. SCHEEL, Primary Examiner

A. O. HENDERSON, Assistant Examiner

U.S. Cl. X.R.

99—422; 126—211